US012250206B2

(12) United States Patent
Grover et al.

(10) Patent No.: US 12,250,206 B2
(45) Date of Patent: Mar. 11, 2025

(54) PROVIDING SINGLE-SIGN-ON FOR MULTIFACTOR AUTHENTICATION

(71) Applicant: MICRO FOCUS LLC, Santa Clara, CA (US)

(72) Inventors: Douglas Max Grover, Rigby, ID (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 203 days.

(21) Appl. No.: 17/868,576

(22) Filed: Jul. 19, 2022

(65) Prior Publication Data

US 2024/0031351 A1    Jan. 25, 2024

(51) Int. Cl.
*H04L 9/40*   (2022.01)
(52) U.S. Cl.
CPC ........ *H04L 63/0815* (2013.01); *H04L 63/083* (2013.01)
(58) Field of Classification Search
None
See application file for complete search history.

(56) References Cited

U.S. PATENT DOCUMENTS

| 8,141,140 | B2 | 3/2012 | Wenzel | |
|---|---|---|---|---|
| 8,752,124 | B2 | 6/2014 | Radhakrishnan | |
| 9,032,922 | B2 | 5/2015 | Moon et al. | |
| 9,317,673 | B2 | 4/2016 | Grigg | |
| 10,595,206 | B1 * | 3/2020 | Latsha | H04W 12/12 |
| 2005/0144452 | A1 * | 6/2005 | Lynch | G06F 21/33 |
| | | | | 713/170 |
| 2014/0359290 | A1 * | 12/2014 | McCusker | H04L 9/321 |
| | | | | 713/168 |
| 2020/0201294 | A1 * | 6/2020 | Nelson | G06F 21/602 |
| 2024/0031351 | A1 * | 1/2024 | Grover | H04L 63/083 |

* cited by examiner

*Primary Examiner* — Kaveh Abrishamkar
(74) *Attorney, Agent, or Firm* — Sheridan Ross P.C.

(57) ABSTRACT

A request to authenticate is received. For example, the request to authenticate may be to authenticate to a software application or a device. The request to authenticate is for a first authentication level for a user. The first authentication level is one of a plurality of authentication levels for the user. The request to authenticate is authorized based on a provided one or more authentication factors (e.g., a valid username/password). A plurality of authentication tokens are retrieved. The plurality of authentication tokens are associated with the first authentication level. In addition, each authentication token of the plurality of authentication tokens is associated with an individual application of a plurality of applications. Access to information in the plurality of applications is granted based on the plurality of authentication tokens.

20 Claims, 9 Drawing Sheets

| Tokenization Table (User Auth. Level Based Tokens) (User 103A) | | | | |
|---|---|---|---|---|
| Authentication Level(s) | Token | Key | Access | |
| L1 -- Username/Password | AAAAAA | Level One Key (64-Bit Key) | Level One Data (Read Only) | 301A |
| L2 -- Username/Password and SMS | BBBBBB | Level One Key (64-Bit Key) | Level One Data (Read/Write) | 301B |
| L3 -- Username/Password, SMS, and Fingerprint Scan | CCCCCC | Level Two Key (512-Bit Key) | Level Two Data (Read/Write) | 301C |
| L4 Username/Password, SMS, and Iris Scan | DDDDDD | Level Three Key (1028-Bit Key) | Level Three Data (Read/Write) | 301D |

FIG. 3

| Tokenization Table (Role Based Tokens) | | | | |
|---|---|---|---|---|
| Authentication Level(s) | Token | Role | Access | |
| R1 -- Username/Password | EEEEEE | Developer | Check-In/Modify | 401A |
| R2 -- Username/Password | FFFFFFF | Tester | Add Test Results | 401B |
| R3 -- Username/Password and SMS | GGGGGG | Engineering Manager | Approve/Reject (Module Level) | 401C |
| R4 -- Username/Password, SMS, and Fingerprint Scan | HHHHHH | Product Manager | Approve/Reject for Ship | 401D |

| Tokenization Table (User Auth. Level/Role Tokens) (User A) ||||||
|---|---|---|---|---|---|
| Authentication Level(s) | Token | Key/Credential | Application | Access | Domain |
| L1/R5 -- Username/ Password | AAAAAA | Level One Key (64-Bit Key) | File Server Application | Level One Data (Read Only) | 201A |
| | XXXXXX | Auth. Credential | Firewall Application | Access Privilege (View Only) | 201N |
| L2/R3 -- Username/ Password and SMS | BBBBBB | Level Two Key (64-Bit Key) | File Server Application | Level One Data (Read/Write) | 201A |
| | GGGGGG | Auth. Credential | Product Management Application (Eng. Man.) | Approve/Reject (Module Level) | 201B |
| L3/R6/R7 -- Username/ Password, SMS, and Fingerprint Scan | CCCCCC | Level Three Key (512-Bit Key) | File Server Application | Level Two Data (Read/Write) | 201A |
| | YYYYYY | Auth. Credential | File Server Application | Administrative Access | 201A |
| | ZZZZZZ | Auth. Credential | Product Management Application | Administrator Privileges | 201B |
| L4 -- Username/ Password, SMS, and Iris Scan | DDDDDD | Level Three Key (1028-Bit Key) | File Server Application | Level Three Data (Read/Write) | 201A |

PROVIDING SINGLE-SIGN-ON FOR MULTIFACTOR AUTHENTICATION

FIELD

The disclosure relates generally to authentication processes and particularly to single-sign-on using multifactor authentication.

BACKGROUND

Currently, existing authentication systems are fairly monolithic when it comes to authenticating a user where multi-factor authentication is required. For example, a user may authenticate with a username/password and be authenticated based on the user's roles. If the same user wants to authenticate to a second system, existing single-sign-on systems work well when there is only a single authentication factor need. For example, if only a username/password is required, the user can be authenticated using single-sign-on with existing systems. However, existing single-sign-on systems fall short if different systems require multifactor authentication. This problem is exasperated even further if the different systems require different access/roles.

SUMMARY

These and other needs are addressed by the various embodiments and configurations of the present disclosure. The present disclosure can provide a number of advantages depending on the particular configuration. These and other advantages will be apparent from the disclosure contained herein.

A request to authenticate is received. For example, the request to authenticate may be to authenticate to a software application or a device. The request to authenticate is for a first authentication level for a user. The first authentication level is one of a plurality of authentication levels for the user. The request to authenticate is authorized based on a provided one or more authentication factors (e.g., a valid username/password). A plurality of authentication tokens are retrieved. The plurality of authentication tokens are associated with the first authentication level. In addition, each authentication token of the plurality of authentication tokens is associated with an individual application of a plurality of applications. Access to information in the plurality of applications is granted based on the plurality of authentication tokens.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As described herein and in the claims, the term "information" can be or may include data, records, a feature, a function, an application(s), a device, an operating system, a container, a hypervisor, a virtual machine, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
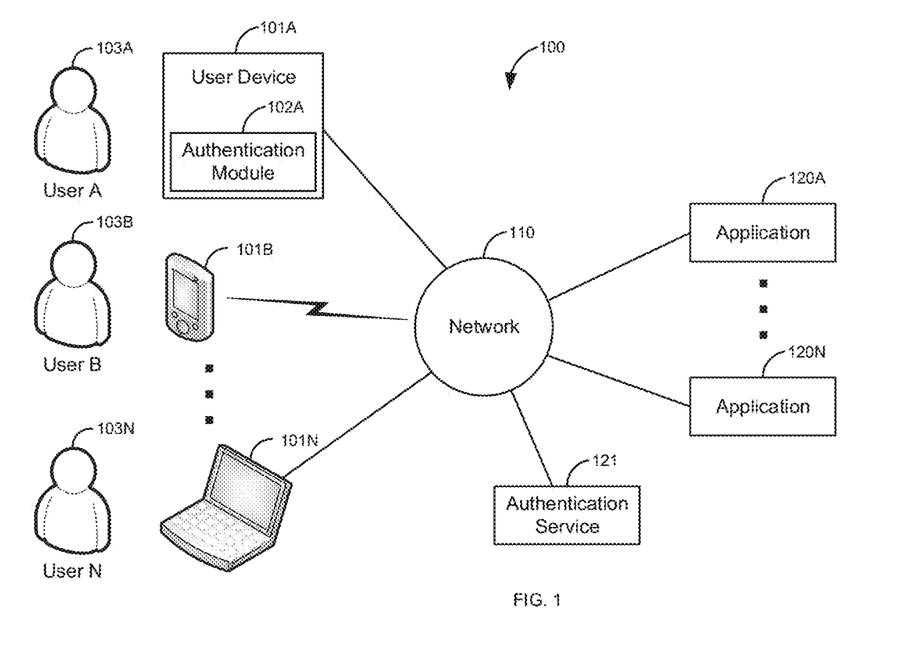
FIG. 1 is a block diagram of a first illustrative system for providing single-sign-on multifactor authentication.

FIG. 1 is a block diagram of a first illustrative system 100 for providing single-sign-on multifactor authentication. The first illustrative system 100 comprises user devices 101A-101N, a network 110, applications 120A-120N, and an authentication service 121.

In addition, users 103A-103N are shown for convenience. The user 103 is typically a human user, but may include an application 120, a device, a process, a service, and/or the like.

The user device 101 can be or may include any device that can communicate on the network 110, such as a Personal Computer (PC), a telephone, a video system, a cellular telephone, a Personal Digital Assistant (PDA), a tablet device, a notebook device, a smartphone, a server, an embedded device, and/or the like. As shown in FIG. 1, any number of user devices 101A-101N may be connected to the network 110, including only a single communication device 101.

The user device 101A further comprises an authentication module 102A. The authentication module 102A works in conjunction with the authentication service 121. The authentication module 102A may work with authentication devices/interfaces, such as, a graphical interface (e.g., to receive usernames/passwords), a biometric scanner (e.g., a fingerprint scanner), a microphone (for voiceprints), a camera (e.g., for facial recognition), a Short Message Service (SMS) for generating text message codes, an email service for generating email codes, a chat service for generating chat codes, and/or the like. The authentication module 102A may request the user 103A to provide one or more authentication credentials to authenticate at an authentication level. For example, the authentication module 102A may require the user 103A to provide a username/password and fingerprint scan. Although not shown for convenience, the user devices 101B-101N may also comprise a corresponding authentication module 102 (i.e., authentication modules 102B-102N).

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The applications 120A-120N may be any type of application 120, such as, a web application, a financial application, a database application, a human resource application, a security application, an embedded device (e.g., a sensor, a printer, and/or the like), an operating system, a container, a virtual machine, a hypervisor, and/or the like. The applications 120A-120N may require different types of authentication factors for accessing the applications 120A-120N. In addition, the applications 120A-120N may uses different roles/authentication levels in order to access the applications 120A-120N.

The authentication service 121 is used to provide single-sign-on for the applications 120A-120N where multifactor authentication is required. This includes where the applications 120A-120N may require different authentication factors, authentication levels, different domains, and/or roles.

Figure 2:
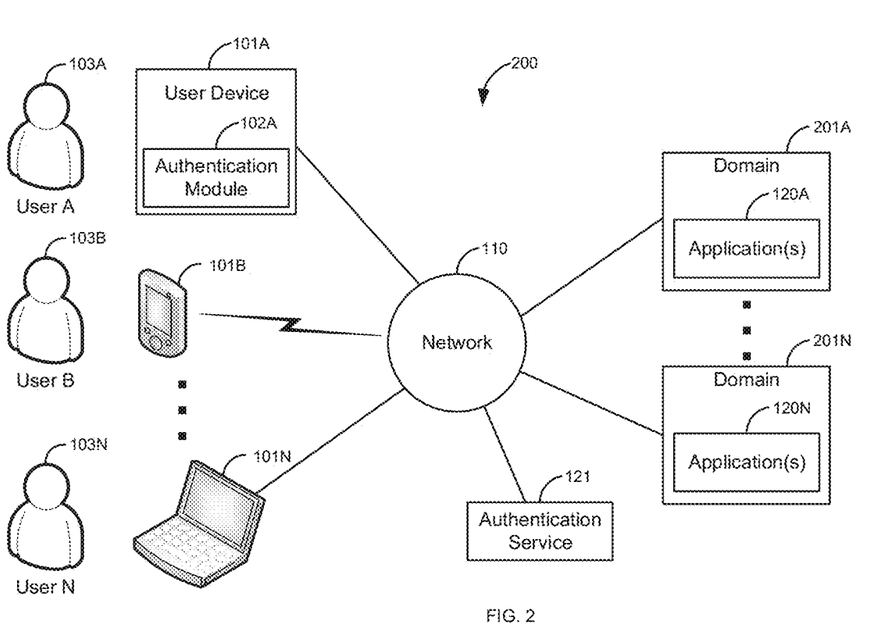
FIG. 2 is a block diagram of a second illustrative system for providing single-sign-on multifactor authentication for domains.

FIG. 2 is a block diagram of a second illustrative system 200 for providing single-sign-on multifactor authentication for domains 201A-201N. The second illustrative system 200 comprises the user devices 101A-101N, the network 110, the applications 120A-120N, the authentication service 121, and domains 201A-201N.

The primary difference between the first illustrative system 100 and the second illustrative system 200 is that the applications 120A-120N are in different domains 201A-201N. A domain 201 is where an entity (e.g., a user 103, a corporation, a government, an organization, and/or the like) controls the domain 201. Each domain 201A-201N is separate from the other domains 201. For example, a first corporation may control the domain 201A and a second corporation may control the domain 201N. The domains 201A-201N may be on separate networks 110 or on the same network 110. For example, the domain 201A and the domain 201N may each be on separate networks 110.

The authentication service 121 provides authentication services between the domains 201A-201N. For example, the user 103A can authenticate using the authentication service 121 and be able to access the applications 120A-120N in the domains 201A-201N based on a single authentication using one or more authentication levels.

Figure 3:
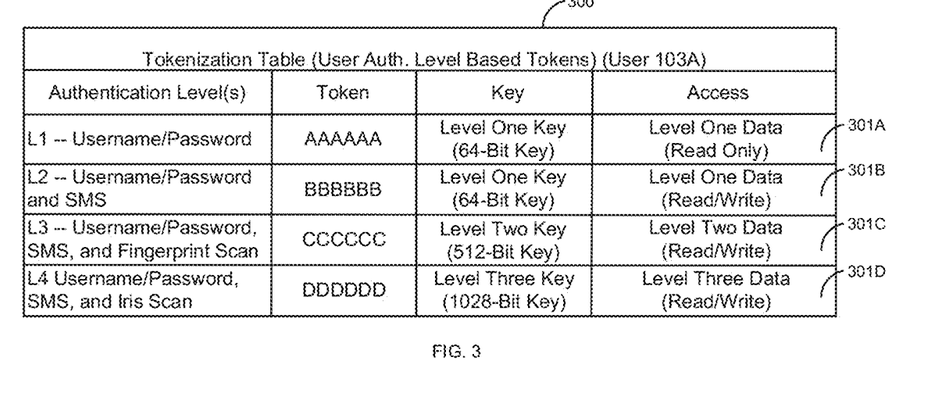
FIG. 3 is an exemplary tokenization table based on authentication levels.

FIG. 3 is an exemplary tokenization table 300 that uses rows 301A-301D based on authentication levels for the user 103. The tokenization table 300 uses authentication tokens in combination with authentication level(s) to provide a single-sign-on process to the applications 120A-120N. Each application 120A-120N may have different authentication requirements and/or permissions. In FIG. 3, each row 301A-301D comprises an authentication level (L1-L4), an authentication token associated with the authentication level, an associated encryption key, and one or more access privileges associated with the authentication level.

Each authentication level (L1-L4) allows the user 103 to have different access privileges for the application 120 (e.g., files on a server). The access privileges may be based on various characteristics, such as read only, read/write, and/or the like. The access may be based on a type of data, such as, specific fields, specific tables, specific records, and/or the like. The access may be at an application level. The first authentication level (L1) defined in row 301A requires the user 103 to authenticate with a valid username/password. When the user 103 has authenticated using the valid username/password, the authentication token AAAAAA has an associated level one encryption key (a 64-bit encryption key). The authentication token AAAAAA allows the user 103 read only access privileges to the level one data. The 64-bit encryption key allows the user 103 to unencrypt and view the level one data.

The second authentication level defined in row 301B requires the user 103 to authenticate with a valid username/password and provide a valid SMS code. When the user 103 has authenticated using the valid username/password and provided the valid SMS code, the authentication token BBBBBB has the same associated level one encryption key (64-bit encryption key). However, the authentication token BBBBBB gives the user 103 additional privileges (write) for the level one data. The 64-bit encryption key (the same one as level one) allows the user 103 to unencrypt, make changes, and re-encrypt the level one data.

The third authentication level in row 301C requires the user 103 to authenticate with a valid username/password, provide a valid SMS code, and provide a valid fingerprint scan. When the user 103 has authenticated in using the valid username/password, provided the valid SMS code, and provided the valid fingerprint scan, the authentication token CCCCCC has an associated level two encryption key (512-bit key). The authentication token CCCCCC gives the user 103 read/write access to the level three data using the 512-bit key. The user 103 may also have access to the level one data/64-bit key and read and/or write privileges based on defined rules. In this embodiment, the user 103 may be given the authentication tokens BBBBBB/CCCCCC to allow the user 103 to access both the level one data and the level two data along with access to both encryption keys. Alternatively, the authentication token CCCCCC may allow the user 103 to have full access to the level one data/level two data including access to both encryption keys.

The fourth level in row 301D requires the user 103 to authenticate with a valid username/password, provide a valid SMS code, and provide a valid iris scan. When the user 103 has authenticated using the valid username/password, provided the valid SMS code, and the valid iris scan, the authentication token DDDDDD has an associated level four encryption key (1028-bit key). The authentication token DDDDDD gives the user 103 read/write access to the level four data using the 1028-bit key. The user 103 may also have access to the level two data/64-bit key and to the level three data/512-bit key with read and/or write privileges. In one embodiment, the user 103 may receive all three authentication tokens BBBBBB, CCCCCC, and DDDDDD. In this example, the authentication token AAAAAA is not needed because the authentication token BBBBBB has all the privileges of the authentication token AAAAAA. However, the authentication token AAAAAA may also be provided.

Figure 4:
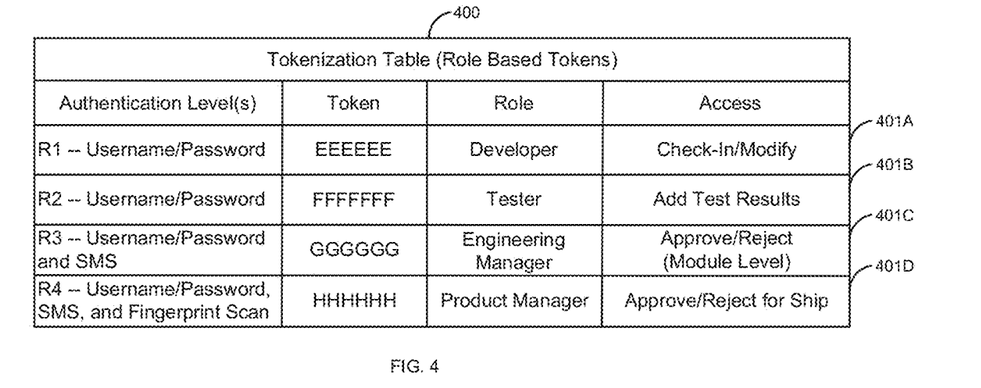
FIG. 4 is an exemplary tokenization table based on roles.

FIG. 4 is an exemplary tokenization table 400 based on roles. For example, the tokenization table 400 is used for granting access to different features of a product management application 120. There are four defined roles for each row 401A-401D: 1) developer (row 401A), 2) tester (row 401B), 3) engineering manager (row 401C), and 4) product manager (row 401D). Each row 401A-401D has an authentication level, an associated authentication token, an associated role, and one or more access privileges associated with the authentication level. Users 103 in the same role may share the same token or may have separate authentication tokens that provide the same access. The roles may be administered. For example, role one is for a developer. The developer has to authenticate using a valid username/password in order to check-in/modify code for the software development process. Role two is for a tester. The tester has to authenticate using a valid username/password in order to add test results to the product management application 120. Role three is for an engineering manager (e.g., a manager over the developer/tester). The engineering manager has to authenticate with a valid username/password and provide a valid SMS code. If the engineering manager has authenticated using the valid username/password and provided the valid SMS code, the engineering manager can approve and/or reject at a module level (component level). Role four is for a product manager. The product manager has to authenticate using a valid username/password, provide a valid SMS code, and provide a valid fingerprint scan. Once the product manager has authenticated using the valid username/password, provided the valid SMS code, and provided the valid fingerprint scan, the product manager can approve (or reject) the software project for shipment.

The role could be any type of role. For example, the role may be for a signature level when approving invoices. For level one (supervisor level), the user 103 would be able to approve purchase orders up to $1,000. For level two, the user 103 could approve purchase orders up to $10,000 and so on.

In addition to the described authentication levels, the authentication levels can include other authentication factors, such as gestures. For example, a username/password+gesture one=authentication level/role one, username/password+gesture two=authentication level/role two and so forth.

Alternatively, the authentication levels can be based on a super password. For example, the super password "Hello world it is going to be a good day today" may provide three authentication levels: 1) "Hello world" (level one), 2) "it is going to be a good" (level two), and 3) "day today" (level three). For level one access, the user 103 only has to provide the password "Hello world". For level two access, the user 103 provides the password "Hello world it is going to be a good" and for level three access, the user 103 provides the password "Hello world it is going to be a good day today".

Figure 5:
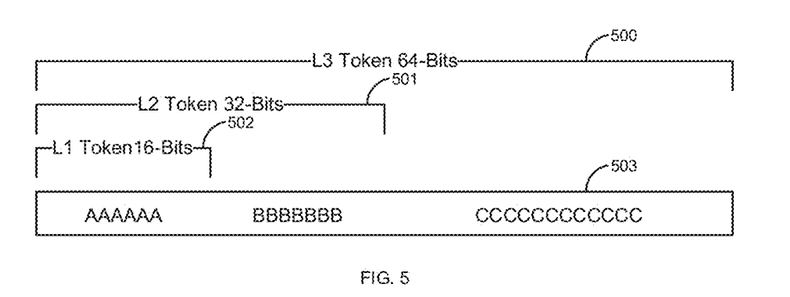
FIG. 5 is a diagram of a split token.

FIG. 5 is a diagram of a split token 503. A split token 503 is where the authentication tokens 500-502 may be different sizes (but do not have to be) based on the authentication levels. For example, for level one, the authentication token 502 may be 16-bits, for level two, the authentication token 501 may be 32-bits, and for level three, the authentication token 500 may be 64-bits (or could be 48-bits). The sizes of the different tokens 500-502 may vary based on implementation.

In FIG. 5, the level one authentication token 502 is AAAAAA. The level two authentication token 501 (also a super authentication token) is AAAAAABBBBBB. The level three super authentication token 500 is AAAAAABBBBBBCCCCCCCCCCCC. From the level three super authentication token 500, the process can derive the level one authentication token 502, the level two authentication token 501, and the level three super token 500.

If a nonce/HMAC process is used for each of the authentication tokens 500-502, this can be used to make the identity of the individual authentication tokens 500-502 more difficult to identify. When the super authentication token 500 is received, the system can derive the lower-level authentication tokens 501-502 and provide the level one through level three access/roles based on each of the authentication tokens 500-502.

The split token of FIG. 5 may be used for any process described herein. For example, the split token may be used for the tokenization tables described in FIGS. 3-4 and 6.

Figure 6:
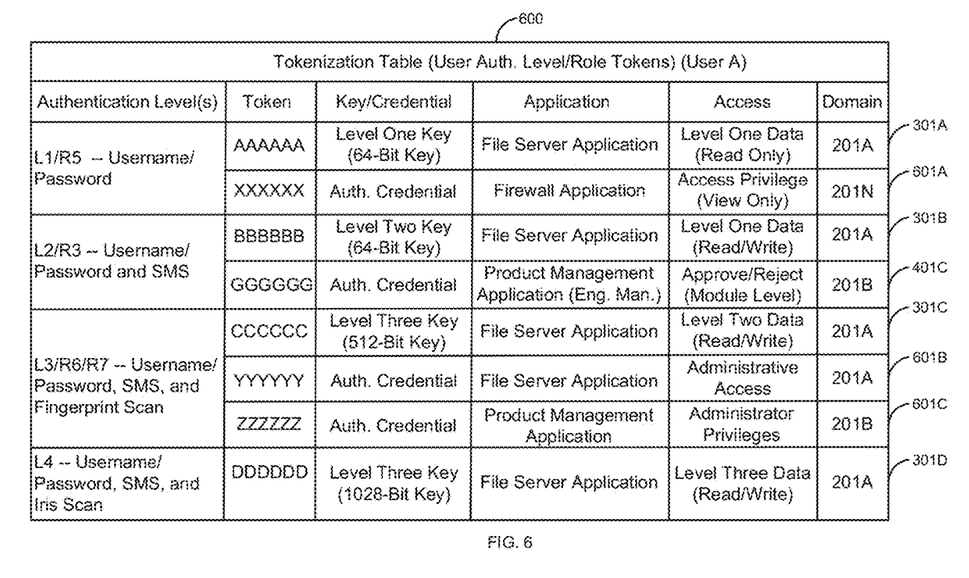
FIG. 6 is an exemplary tokenization table based on a combination of authentication levels/roles/domains.

FIG. 6 is an exemplary tokenization table 600 based on a combination of authentication levels/roles/domains 201 that are described in FIGS. 3-4. FIG. 6 is described where each of the applications 120 (the first server application 120, the firewall application 120, and the product management application 120) are in different domains 201A-201N. The file server application 120 is in domain 201A, the product management application 120 is in domain 201B, and the firewall application 120 is in domain 201N. A domain 201 is where the application 120 is managed by a different entity (e.g., three different corporations).

In FIG. 6 the user 103 has the same access levels (L1-L4)/authentication tokens (AAAAAA/BBBBBB/CCCCCC/DDDDDD) defined in FIG. 3 for the file server application 120 in the domain 201A. For example, the user 103 has the authentication token AAAAAA associated with the level one authentication (username/password) to access level one data using the 64-bit encryption key as shown in row 301A. In addition, for providing the same valid username/password, the user 103 also has role of view only on the firewall application 120 in the domain 201N with an associated authentication token of XXXXXX as shown in row 601A. Thus, when the user 103 authenticates in with a valid username/password, there are two authentication tokens (AAAAAA/XXXXXX) for two different applications 120 in two different domains 201A/201N associated with the single sign-on. This allows user 103 to sign-on once to both the file server application 120 (level one data/read only) and the firewall application 120 (view only access) using the two different authentication tokens AAAAAA/XXXXXX. In addition, because there are different tokens for each domain 201, if one token is compromised, the other token is still secure.

The user 103 also has two authentication tokens BBBBBB/GGGGGG associated with providing a valid username/password and valid SMS code (level two). The first authentication token BBBBBB is the same authentication token as defined in FIG. 3 that gives level one access (read/write) using the 64-bit encryption key to the file server application 120 in domain 201A as shown in row 301B. Likewise, for providing the valid username/password and SMS code, the user 103 has the authentication token GGGGGG, which provides access to the product management application 120 in domain 201B in role three (Approve Reject at the module level) as shown row 401C. Thus, the user 103 can sign-on once with the valid username/password and valid SMS code and have level two access to the file server application 120 in the domain 201A and role three (approve reject at the module level) in the product management application 120 in domain 102B based on the two authentication tokens BBBBBB/GGGGGG. Authenticating in at level two may also grant access to level one (e.g., also provide the authentication token XXXXXX to access the firewall application 120 in the domain 201N and authentication token AAAAAA to access the file server application 120 in the domain 201A). The multilevel access may be accomplished based on the level two authentication tokens (BBBBBB/GGGGGG) only or both the level two authentication tokens (BBBBBB/GGGGGG)/level one authentication tokens (AAAAAA/XXXXXX).

The user 103 has three authentication tokens associated with providing a valid username/password, a valid SMS code, and a valid fingerprint scan for level three authentication. The first authentication token CCCCCC is for level three access to the file server application 120 in the domain 201A using the 512-bit encryption key as shown in row 301C. The second authentication token YYYYYY has an authentication credential that is also associated with the file server application 120 in the domain 201A. However, the second authentication token YYYYYY is a role-based authentication token that gives the user 103 administrative access to the file server application 120 in domain 201A as shown in row 601B. The third authentication token ZZZZZZ has an associated authentication credential for the product management application 120 in the domain 201B. The third authentication token gives the user 103 administrator privileges for the product management application 120 in the domain 201B as shown in row 601C. For the valid username/password, valid SMS code, and valid fingerprint scan for authentication level three, there are not only different authentication tokens associated with different applications 120 (the file server application 102/product management application 120) in different domains 201A/201B, but also two different authentication tokens associated with different roles/access on the same application 120 (authentication tokens CCCCCC/YYYYYY for level three data/administrative role). This allows the user 103 to sign-on once to the file server application 120 (level three data read/write/administrative privileges)/product management application 120 (administrative privileges). Authenticating at level three may also grant access to levels one/two authentication tokens like described above. The access may be accomplished based on the level three authentication tokens (CCCCCC/YYYYYY/XXXXXX) only or both the level two authentication tokens (BBBBBB/GGGGGG)/level one authentication tokens (AAAAAA/XXXXXX).

Likewise, the user 103 also has level four access to the file server application 120 by providing a valid username/password, a valid SMS code, and a valid iris scan as shown in row 301D. The authentication token DDDDDD provides the user 103 access to the 1028-bit encryption key to unencrypt/encrypt the level four data on the file server application 120 in the domain 201A. Authenticating in at level four may also grant access to levels one/two/three like described above. The access may be accomplished based only on the level four authentication token (DDDDDD), or the level three authentication tokens (CCCCCC/YYYYYY/XXXXXX) and both the level two authentication tokens (BBBBBB/GGGGGG)/level one authentication tokens (AAAAAA/XXXXXX). For example, the authentication token CCCCCC and/or YYYYYY may grant access to the level one/level 2 data. Likewise, the authentication token ZZZZZZ may grant access to the level product management role (approve/reject at the module level).

In one implementation, if the user 103 authenticates using a valid username/password, provides an SMS code, provides a valid fingerprint scan, and provides a valid iris scan, the user 103 would have access to all the authentication tokens of FIG. 6 (AAAAAA, BBBBBB, CCCCCC, DDDDDD, GGGGGG, XXXXXX, YYYYYY, and ZZZZZZ). In this embodiment, authenticating at one authentication level does not provide access to another authentication level (i.e., the authentication levels are mutually exclusive).

Figure 7:
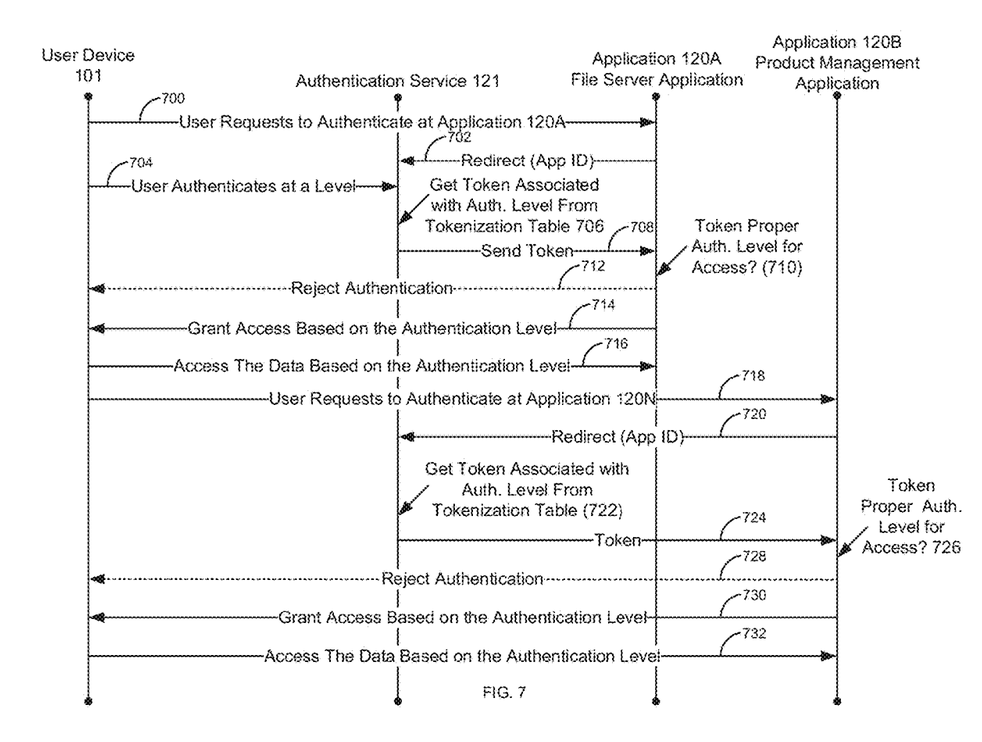
FIG. 7 is a flow diagram of a single-sign-on process using multifactor authentication.
Figure 8:
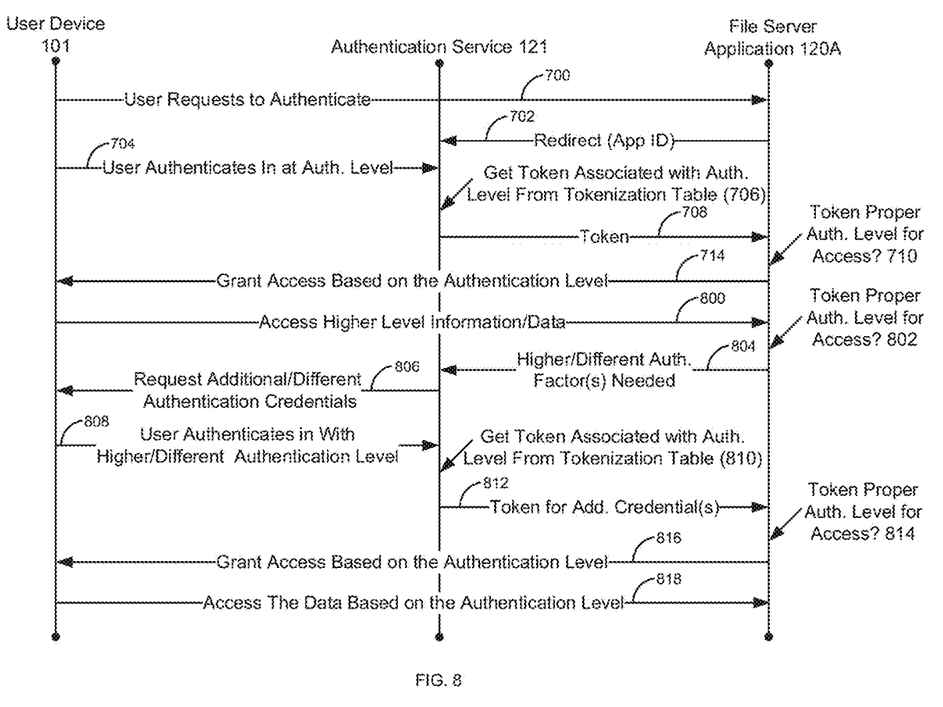
FIG. 8 is a flow diagram of a process for requesting additional authentication as part of a single-sign-on process.
Figure 9:
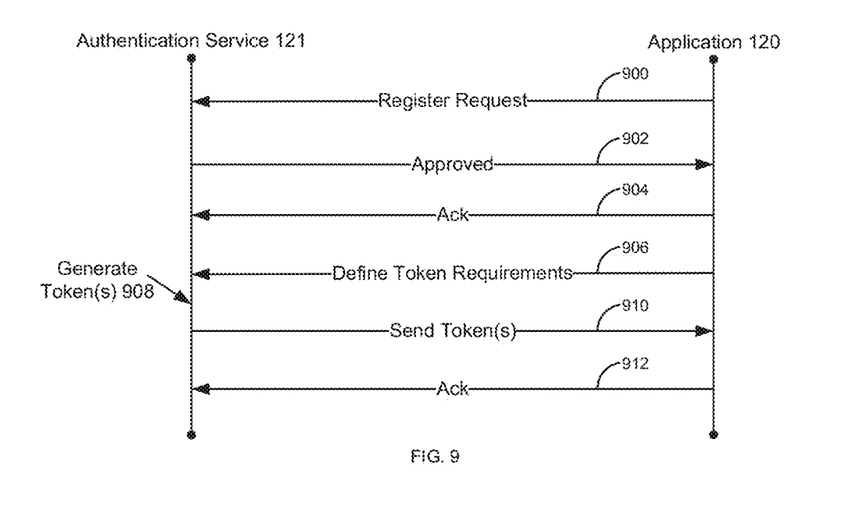
FIG. 9 is a flow diagram of a process for exchanging tokens.

FIG. 7 is a flow diagram of a single-sign-on process using multifactor authentication. Illustratively, the user devices 101A-101N, the authentication modules 102A-102N, the applications 120A-120N, and the authentication service 121 are stored-program-controlled entities, such as a computer or microprocessor, which performs the methods of FIGS. 7-9 and the processes described herein by executing program instructions stored in a computer readable storage medium, such as a memory (i.e., a computer memory, a hard disk, and/or the like). Although the methods described in FIGS. 7-9 are shown in a specific order, one of skill in the art would recognize that the steps in FIGS. 7-9 may be implemented in different orders and/or be implemented in a multi-threaded environment. Moreover, various steps may be omitted or added based on implementation.

The tokenization tables 300, 400, and 600 may be used as part of a single-sign-on process as shown in FIG. 7. The process of FIG. 7 is described using the tokenization table described in FIG. 6 where the application 120A is in the domain 201A and the project management application 120B is in the domain 201B. Although not shown for convenience, the firewall application 120N may authenticate in a similar manner according to the tokenization table 600.

The user 103 requests to authenticate with the file server application 120A in step 700. The user 103 is redirected to the authentication service 121 in step 702. The redirection message of step 702 has an application identifier that identifies the application 120A. The user 103 authenticates at an authentication level (level two), in step 704, with a valid username/password and a valid SMS code. The valid username/password and the valid SMS code for the file server application 120A has the associated authentication token BBBBBB. The authentication service 121 looks up the authentication token BBBBBB using the application identifier and the authentication factors from the tokenization table 600 in step 706. The authentication service 121 sends the authentication token BBBBBB to the file server application 120A in step 708. The file server application 120A determines, in step 710, that the authentication token BBBBBB allows the user 103 access to level one data with read/write privileges per the tokenization table 600. If the authentication token does not match the proper authentication level in step 710, the authentication is rejected in step 712. Otherwise, the user 103 is granted access to the level one data with read/write privileges based on the 64-bit encryption key in step 714. The user 103 accesses the level one data (read/write) in step 716.

At this point (where the user 103 has already authenticated with a username/password and SMS code), the user 103 requests to authenticate at the product management application 120N in step 718. The user 103 is redirected to the authentication service 121 in step 720. The redirection message of step 720 has an application identifier for the product management application 120N. The authentication service 121 looks up the authentication token GGGGGG using the application identifier and using the currently authenticated authentication factors from the tokenization table 600 in step 722. The authentication service 121 sends the authentication token GGGGGG to the product management application 120N in step 724. The product management application 120N determines, in step 726, that the authentication token GGGGGG gives the user 103 the role of engineering manager with the ability to approve/reject at a module level. If the authentication token is invalid in step 726, the project management 120N rejects the authentication in step 728. Otherwise, the user 103 is granted access with the role of engineering manager in step 730 based on the previous authentication of step 704. The user 103 accesses product management application 120N with the role of engineering manager in step 732 based on the single-sign-on process of step 704.

FIG. 8 is a flow diagram of a process for requesting additional authentication as part of a single-sign-on process. If the user 103 is trying to access an application 120 without the proper authentication factor(s), the process of FIG. 8 allows the user 103 to provide the additional proper authentication credentials.

The steps 700-714 are similar to those described in FIG. 7. The user 103 attempts to access the higher level data/information in step 800. The file server application 120A determines, in step 802, if the user 103 has authenticated at the appropriate authentication level. If the user 103 does not have the proper authentication credentials (i.e., not authenticated at the proper level) in step 802, the file server application 120A sends a message, in step 804, that a higher and/or different authentication factor(s) are needed to the authentication service 121. For example, if the user 103 is trying to access level three data, in step 800, the file system application 120A determines that the authentication token BBBBBB does not provide access to the level three data (the user 103 only has access to the 64-bit encryption key with read/write privileges). The file server application 120A sends the message of step 804 to indicate that the user 103 needs to provide a fingerprint scan to get access to the level three data. The authentication service 121 requests the additional fingerprint scan in step 806. The user 103 provides the fingerprint scan in step 808. The authentication service 121 gets the token DDDDDD in step 810. The authentication service 121 provides the authentication token DDDDDD in step 812. Since the user 103 now has the proper access in step 814, the user 103 is granted access to the level three data in step 816 with the 512-bit encryption key. The user 103 now can accesses the level three data in step 818.

The process of FIGS. 7-8 process could also work using split-key fragments where each authentication factor provides access to a piece of an authentication token. The split-key fragments are generated using any split-key process, such as, Micali encryption (see Fair Public-Key Cryptosystems, Silvio Micali, 1993 Laboratory for Computer Science, Massachusetts Institute of Technology, 545 Technology Square, Cambridge MA 02139, Multiparty Computation (see https://www.hypr.com/key-splitting/#:~:text=Splitting %2C%20or%20key%20splitting%2C%20is, part%20is %20inte rcepted%20and%20analyzed), and/or the like. Each of these references are incorporated herein by reference.

In order for this process to work, it takes into consideration the number of authentication levels and the number of authentication factors needed. To illustrate consider the following example. The authentication token has been fragmented into five fragments where three fragments are required to regenerate the authentication token. Each of the five fragments is associated with one of five different authentication factors (e.g., username/password, SMS code, fingerprint scan, iris scan, and voiceprint). The user 103 can authenticate using any three of the five authentication factors to gain access. When the user 103 authenticates using the three different authentication factors, the three associated fragments are used to regenerate the original authentication token.

FIG. 9 is a flow diagram of a process for exchanging authentication tokens. An application 120 can register with the authentication service 121 in order to define the required authentication levels/generate the necessary authentication tokens.

The application 120 sends, in step 900, a register request. The register request may comprise an authentication credential. The authentication service 121 sends an approved message in step 902. The application 120 acks the approved message in step 904. The application 120 sends a define token requirements message in step 906. The define token requirements message of step 906 may be based on a newly administered user 103. For example, the user 103B may have been given the role of developer in the product management application 120. In this example, the message would be that user 103 is defined with the role of developer in the product management application 120B that requires a username/password and a level one access to the firewall application 120N with view only access that also requires a username/password. The authentication service 121 generates the authentication token(s) in step 908. In this example, the generated authentication token would be a two authentication tokens that may be unique to the user 103 and gives the user 103 access as a developer to the product management application 120/view privileges to the firewall application 120N. The authentication service 121 sends the authentication token(s) to the application 120 in step 910. The application 120 acks the send token message in step 912.

One advantage to this process is that the authentication tokens are specific to the application 120/domain 201. Each application 120 has its own authentication tokens versus traditional systems where there is a single authentication token/group of authentication tokens for the single-sign-on process that are shared between applications 120. In a cloud environment, this can provide an advantage because the authentication tokens for each application 120 are separate and more secure.

The authentication levels may be based on a pool of authentication factors that rotates periodically. For example, level one authentication could require one of three authentication types. If the user 103 uses one of the authentication types one time, the user 103 may be required to use a different authentication type the next time (from the pool). Each Authentication type in the pool may have a different authentication token, even though the authentication level is the same. Likewise, for level three, there may be six authentication factors where two authentication factors are required. Once two authentication factors are used, the user 103 would then be required to use two of the next four authentication factors, and then the last two authentication factors. This process could repeat where the authentication types are randomly required. Thus, the user 103 would not be able to use the same credentials on two different contagious authentications. In one embodiment, the authentication factors may overlap between authentication levels.

There may be unique authentication tokens for each of the authentication factors used each time. For example, if the user 103 authenticates with a username/password, SMS code, and an iris scan, instead of sending a single authentication token, an authentication token representing each authentication factor could be sent (e.g., three authentication tokens in this example). The application 120 can then use the authentication tokens to determine access/role.

The usage may require specific types of authentication factors and one generic authentication factor that rotates. For example, the usage may require the user 103 to provide a first username/password and a SMS code with one of a second password, a fingerprint scan, and an iris scan. If the user 103 signed in using the second password as the first generic factor, next time, the user 103 would have to provide a fingerprint scan or iris scan in addition to the username/password/SMS code.

The authentication tokens may be only for an authentication level. For example, the level three authentication token does not provide access to level one/level two data. This may be where only access to the level three data is wanted to make a specific decision. In this case, the user 103 may only have access to level three data and cannot access and level two data/level one data (assuming levels 1-3). Alternatively, the process may support access to lower levels or specific ones of the lower levels. For example, level three access may also give access to level one data, but not level 2 data.

The authentication token could be divided into sections: 1) for the authentication token and 2) one for the security level of the user 103. Alternatively, there could be two authentication tokens. The security level is another factor that can be used to control access. For example, for level three data, the user 103 may also have to have a level three security level.

In another embodiment, the system may support changing of the authentication tokens dynamically. For example, when an authentication token is used, the authentication service 121 and the application 120 could change the authentication token. The authentication token may be exchanged using the Diffie-Hellman key exchange algorithm after use. Another option would be to periodically change the tokenization table. For example, the entire tokenization table can be changed based on U.S. patent application Ser. No. 17/371,914 entitled "DYNAMIC TOKENIZATION TABLE EXCHANGE,", which is incorporated herein by reference. If there are authentication tokens associated with multiple applications 120, only the authentication tokens related to the specific application 120 would be exchanged. This provides the advantage that the authentication token renewal process can be different for each application 120.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® 15-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a microprocessor; and
a computer readable medium, coupled with the microprocessor and comprising microprocessor readable and executable instructions that, when executed by the microprocessor, cause the microprocessor to:
receive a first request to authenticate, wherein the first request to authenticate is for a first authentication level for a user and wherein the first authentication level is one of a plurality of authentication levels for the user;
authorize the first request to authenticate based on a provided first one or more authentication factors;
retrieve a first plurality of authentication tokens based on the provided first one or more authentication factors to authorize the first request, wherein the first plurality of authentication tokens are associated with the first authentication level and wherein each authentication token of the first plurality of authentication tokens is associated with a different individual application of a first plurality of applications based on the provided first one or more authentication factors to authorize the first request; and
grant access to first level information in the first plurality of applications based on the first plurality of authentication tokens.

2. The system of claim 1, wherein the first plurality of applications are in a plurality of domains, wherein each authentication token of the first plurality of authentication tokens is associated with an application of the first plurality of applications in the plurality of domains, and wherein each domain of the plurality of domains is operated by a different entity.

3. The system of claim 2, wherein the microprocessor readable and executable instructions further cause the microprocessor to:
receive a second request to authenticate, wherein the second request to authenticate is for a second authentication level for the user;
authorize the second request to authenticate based on a provided second one or more authentication factors;
retrieve a second plurality of authentication tokens, wherein the second plurality of authentication tokens are associated with the second authentication level and wherein each authentication token of the second plurality of authentication tokens is associated with an individual domain of the plurality of domains; and
grant access to second level information in the plurality of domains based on the second plurality of authentication tokens.

4. The system of claim 1, wherein the first plurality of authentication tokens comprise at least one split token and wherein a super token of the split token grants access to each of the plurality of authentication levels for the user.

5. The system of claim 1, wherein the plurality of authentication levels are mutually exclusive, wherein the plurality of authentication levels comprises at least two authentication levels that each require a different authentication factor, and wherein authorizing the first request to authenticate is based on providing the different authentication factors for the last least two authentication levels.

6. The system of claim 1, wherein the first plurality of authentication tokens further comprises one or more authentication tokens of one or more lower authentication levels.

7. The system of claim 1, wherein at least one of the first plurality of authentication tokens is a split-key fragment.

8. The system of claim 7, wherein the split-key fragment comprises a plurality of split-key fragments and wherein individual ones of the plurality of split-key fragments are associated with individual ones of a plurality of authentication factors.

9. The system of claim 7, wherein the provided first one or more authentication factors requires at least one of a group of authentication factors to authorize the first request.

10. The system of claim 1, wherein the plurality of authentication levels for the user is based on a super password.

11. The system of claim 1, wherein at least one of the plurality of authentication levels uses a pool of authentication factors that rotates periodically and wherein each authentication factor in the pool of authentication factors has a separate authentication token.

12. The system of claim 1, wherein the at least one of plurality of authentication levels for the user comprises a specific type of authentication factor and a rotating authentication factor.

13. The system of claim 1, wherein the provided first one or more authentication factors each has an associated authentication token.

14. A method, comprising:
receiving, by a microprocessor, a first request to authenticate, wherein the first request to authenticate is for a first authentication level for a user and wherein the first authentication level is one of a plurality of authentication levels for the user;
authorizing, by the microprocessor, the first request to authenticate based on a provided first one or more authentication factors;
retrieving, by the microprocessor, a first plurality of authentication tokens, based on the provided first one or more authentication factors to authorize the first request wherein the first plurality of authentication tokens are associated with the first authentication level and wherein each authentication token of the first plurality of authentication tokens is associated with a different individual application of a first plurality of applications based on the provided first one or more authentication factors to authorize the first request; and granting access, by the microprocessor, to first level information in the first plurality of applications based on the first plurality of authentication tokens.

15. The method of claim 14, wherein the first plurality of applications are in a plurality of domains, wherein each authentication token of the first plurality of authentication tokens is associated with an application of the first plurality of applications in the plurality of domains, and wherein each domain of the plurality of domains is operated by a different entity.

16. The method of claim 15, further comprising:
receiving a second request to authenticate, wherein the second request to authenticate is for a second authentication level for the user;
authorizing the second request to authenticate based on a provided second one or more authentication factors;
retrieving a second plurality of authentication tokens, wherein the second plurality of authentication tokens are associated with the second authentication level and wherein each authentication token of the second plurality of authentication tokens is associated with an individual domain of the plurality of domains; and
granting access to second level information in the plurality of domains based on the second plurality of authentication tokens.

17. The method of claim 14, wherein the first plurality of authentication tokens comprise at least one split token and wherein a super token of the split token grants access to each of the plurality of authentication levels for the user.

18. The method of claim 14, wherein the plurality of authentication levels are mutually exclusive, wherein the plurality of authentication levels comprises at least two authentication levels that each require a different authentication factor, and wherein authorizing the first request to authenticate is based on providing the different authentication factors for the last least two authentication levels.

19. The method of claim 14, wherein the first plurality of authentication tokens further comprises one or more authentication tokens of one or more lower authentication levels.

20. A non-transient computer readable medium having stored thereon instructions that cause a processor to execute a method, the method comprising instructions to:
receive a first request to authenticate, wherein the request to authenticate is for a first authentication level for a user and wherein the first authentication level is one of a plurality of authentication levels for the user;
authorize the request to authenticate based on a provided one or more authentication factors;
retrieve a plurality of authentication tokens based on the provided first one or more authentication factors to authorize the first request, wherein the plurality of authentication tokens are associated with the first authentication level and wherein each authentication token of the plurality of authentication tokens is associated with a different individual application of a plurality of applications based on the provided first one or more authentication factors to authorize the first request; and
grant access to first level information in the plurality of applications based on the plurality of authentication tokens.

\* \* \* \* \*